US009322318B2

(12) United States Patent
O'Brien et al.

(10) Patent No.: US 9,322,318 B2
(45) Date of Patent: Apr. 26, 2016

(54) HYBRID FASCIA MOUNTED EXHAUST TIP ASSEMBLY

(71) Applicant: MAGNA INTERNATIONAL INC., Aurora (CA)

(72) Inventors: Timothy F. O'Brien, White Lake, MI (US); Lonnie E. Adkins, Grand Blanc, MI (US); Todd Deaville, Markham (CA); Jamie J. Ecker, Chesterfield, MI (US); Dean E. Comeau, Guelph (CA); David S. Dyke, Harrison Township, MI (US); Bradford D. Armstrong, Barrie (CA)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 14/447,096

(22) Filed: Jul. 30, 2014

(65) Prior Publication Data

US 2014/0360801 A1  Dec. 11, 2014

Related U.S. Application Data

(63) Continuation of application No. 13/351,776, filed on Jan. 17, 2012, now Pat. No. 8,863,886.

(60) Provisional application No. 61/574,251, filed on Jul. 29, 2011, provisional application No. 61/574,330, filed on Aug. 1, 2011.

(51) Int. Cl.
  *F01N 13/08* (2010.01)
  *B60R 13/08* (2006.01)
  *F01N 13/18* (2010.01)

(52) U.S. Cl.
  CPC .......... *F01N 13/082* (2013.01); *B60R 13/0876* (2013.01); *F01N 13/1805* (2013.01); *F01N 13/08* (2013.01); *F01N 13/18* (2013.01)

(58) Field of Classification Search
  None
  See application file for complete search history.

(56) References Cited

U.S. PATENT DOCUMENTS

| 3,870,083    | A  | 3/1975  | Nezat            |
| 4,629,226    | A  | 12/1986 | Cassel et al.    |
| 7,007,720    | B1 | 3/2006  | Chase et al.     |
| 7,686,131    | B1 | 3/2010  | Osterkamp et al. |
| 8,863,886    | B2 | 10/2014 | O'Brien et al.   |
| 2004/0232625 | A1 | 11/2004 | Kerchner et al.  |
| 2005/0061571 | A1 | 3/2005  | Chen             |
| 2006/0070789 | A1 | 4/2006  | Dirkson          |
| 2009/0265934 | A1 | 10/2009 | Lee et al.       |

FOREIGN PATENT DOCUMENTS

| EP | 1 816 325  | 3/2010  |
| JP | 2004308551 | 11/2004 |

OTHER PUBLICATIONS

"Invitation to Pay Additional Fees and, Where Applicable, Protest Fees" for priority PCT Application No. PCT/US2012/0485977; mailed Feb. 15, 2013.

*Primary Examiner* — J Allen Shriver, II
*Assistant Examiner* — Hilary L Johns
(74) *Attorney, Agent, or Firm* — Warn Partners, P.C.

(57) ABSTRACT

An exhaust module made of a thermoplastic material which is connected to a fascia or bumper of a vehicle. In one embodiment, the hybrid fascia mounted exhaust tip assembly includes a bracket. The bracket has a large diameter portion which surrounds, but is not in contact with, an exhaust pipe. The exhaust pipe is free to move around as a result of the vehicle traveling over bumps in the road and around turns. The bracket also has a small diameter portion which is connected to the large diameter portion. A ring tip has a portion that slides onto a bezel portion of the small diameter portion.

21 Claims, 7 Drawing Sheets

HYBRID FASCIA MOUNTED EXHAUST TIP ASSEMBLY

CROSS-REFERENCE TO RELATED APPLICATIONS

This application is a continuation of U.S. patent application Ser. No. 13/351,776, filed Jan. 17, 2012, which claims the benefit of U.S. Provisional Application No. 61/574,251, filed Jul. 29, 2011 and U.S. Provisional Application No. 61/574,330, filed Aug. 1, 2011.

FIELD OF THE INVENTION

The present invention relates to hybrid fascia mounted exhaust module made primarily of thermoplastic material resistant to corrosion, which requires minimal secondary operations during assembly.

BACKGROUND OF THE INVENTION

Exhaust systems are used for just about every type of vehicle currently in production around the world. It is commonplace for vehicle owners to add accessories to the vehicle to change the appearance of the vehicle. Once particular type of accessory is a decorative exhaust tip typically made of steel or another type of metal which is chrome plated to provide for an aesthetically pleasing appearance.

One type of design uses a slip-on type steel exhaust tip that is connected directly to the end of the exhaust pipe. This design is subject to corrosion and requires additional welding during assembly operations.

FIGS. 1-2 depict a prior art design that has a metal exhaust module 100 that attaches to the rear bumper fascia 102 of the vehicle. The exhaust module 100 has metal body 104 and welded mounting flanges 106. The welded flanges 106 are used to connect the metal body 104 a larger spacer bracket 108 that connects to the rear fascia 102. The connection of the welded flanges 106, spacer 108 and rear fascia 102 is made with several bolts 110 and nuts 112. An outer surface 114 of the metal body 104 is often chrome polished or painted and can be seen when a person looks at the rear bumper fascia 102 of the vehicle. The exhaust module 100 is not connected to the exhaust pipe but has an inlet portion 103 that is positioned in close relation to the end of the exhaust gas tailpipe for receiving and passing exhaust gas through the exhaust module. Exhaust modules of this type often are formed of several welded steel parts and brackets that come into direct contact with the exhaust gas from the exhaust pipe being formed of steel or some other types of metal.

The above described designs result in undesirable gap between the chrome tip of the exhaust tip or exhaust module and the rear bumper fascia of the vehicle because the design must account for thermal expansion of the metal portions exposed to the hot gasses from the exhaust pipe. The exhaust modules designs that mount to the rear fascia also add a considerable amount of weight causing undue stress on the rear fascia, which is often made of plastic. Also both the metal slip on exhaust tip and exhaust module designs described above are costly to produce because they are primarily made of metal. It is therefore desirable to design an exhaust module that is light weight, low cost, and aesthetically pleasing by having a tight fit or minimal gap to the rear fascia of the vehicle. It is also desirable to produce an exhaust gas module that has a minimal number of components for ease of assembly, which would also result in cost savings.

SUMMARY OF THE INVENTION

The present invention is an exhaust module made of a thermoplastic material which is connected to a fascia or bumper of a vehicle. In one embodiment, the hybrid fascia mounted exhaust tip assembly includes a bracket. The bracket has a large diameter portion which surrounds, but is not in contact with, an exhaust pipe. The exhaust pipe is free to move around as a result of the vehicle traveling over bumps in the road and around turns. The bracket also has a small diameter portion which is connected to the large diameter portion. A ring tip has a portion that slides onto a bezel portion of the small diameter portion. The connection between the ring tip and the small diameter portion provides for a reduced clearance between the ring tip and the fascia, helping to provide for an aesthetically pleasing appearance. In one embodiment, the ring tip is chrome plated. In other embodiments, the ring tip may be made of bright stainless steel, and stamped into the correct shape.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
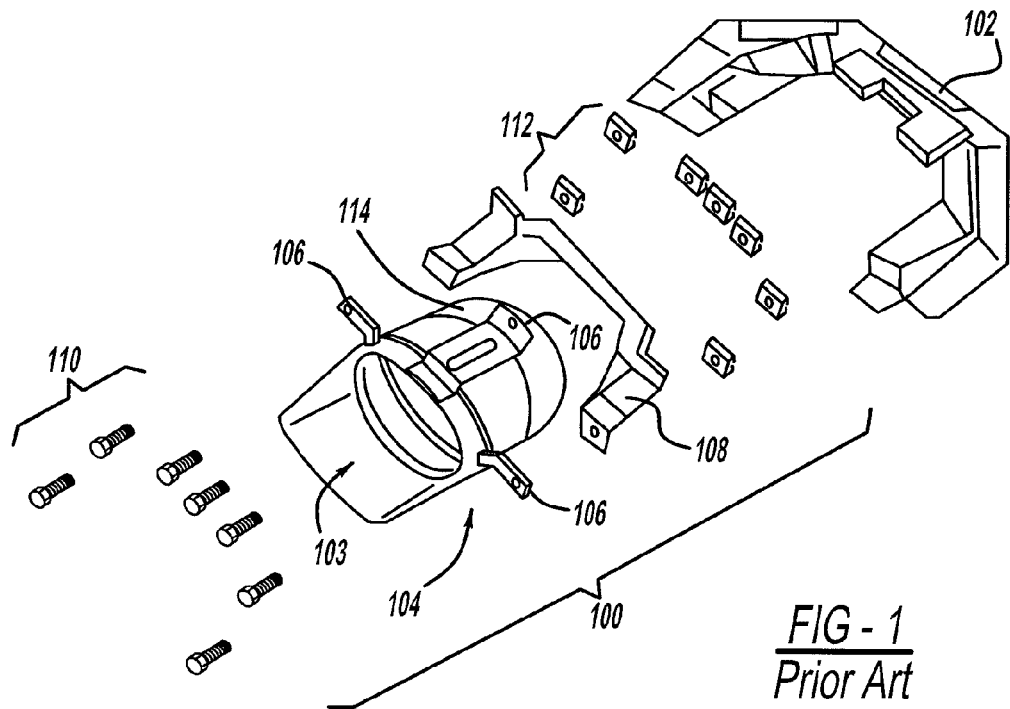
FIG. 1 is an exploded perspective view of a prior art exhaust gas module and fascia.

The following description of the preferred embodiment(s) is merely exemplary in nature and is in no way intended to limit the invention, its application, or uses.

Referring to the FIGS. 2A, 2B, 4A, 4B, 4C, 5, 6 and 7C, which are the figures of the embodiments of the present invention generally, an exhaust module according to the present invention is shown generally at 10. The module 10 includes a bracket, shown generally at 12, and a ring tip, shown generally at 14. The bracket 12 has a plurality of mounting flanges 16, which are used for connecting the bracket 12 to the fascia or bumper of a vehicle (not shown).

The bracket 12 includes a large diameter portion 18 and a small diameter portion 20. The large diameter portion 18 surrounds the end portion of an exhaust pipe 22, which is connected to a muffler, or other exhaust system component. The large diameter portion 18 is about four inches in diameter, and the exhaust pipe 22 is about two inches in diameter, which creates about a one-inch clearance between the exhaust pipe 22 and the large diameter portion 18 of the bracket 12. This clearance limits the exposure of the bracket 12 to the temperatures of the exhaust pipe 22, and allows for the exhaust pipe 22 to have some movement, or "play," as the vehicle travels over bumps, around curves, and the like. While a diameter of four inches for the large diameter portion and a diameter of two inches for the exhaust pipe is disclosed, it is within the scope of this invention for different diameters to be used depending upon the size of the diametrical size of the exhaust pipe.

The bracket 12 in one embodiment of the invention is formed entirely of plastic or polymer such as glass filled nylon, ABS or other polymer materials such as thermoplastic olefins. Forming the bracket 12 out of entirely polymer material is a significant advantage over the prior art which is typically formed of some type of metal, such as steel. Therefore, it is within the scope of this invention for the bracket 12 and to not be formed of metal. It is also within the scope of this invention for the bracket 12 including the large diameter portion 18, small diameter potion 20 to not be formed of metal. It is further within the scope of this invention for the bracket 12, including the large diameter portion 18, small diameter portion 20 and mounting flanges 16 to not be formed of metal. It is also within the scope of this invention for the bracket 12, including the large diameter portion 18, small diameter portion 20, mounting flanges 16 and ring tip 14 to not be formed of metal.

Figure 2:
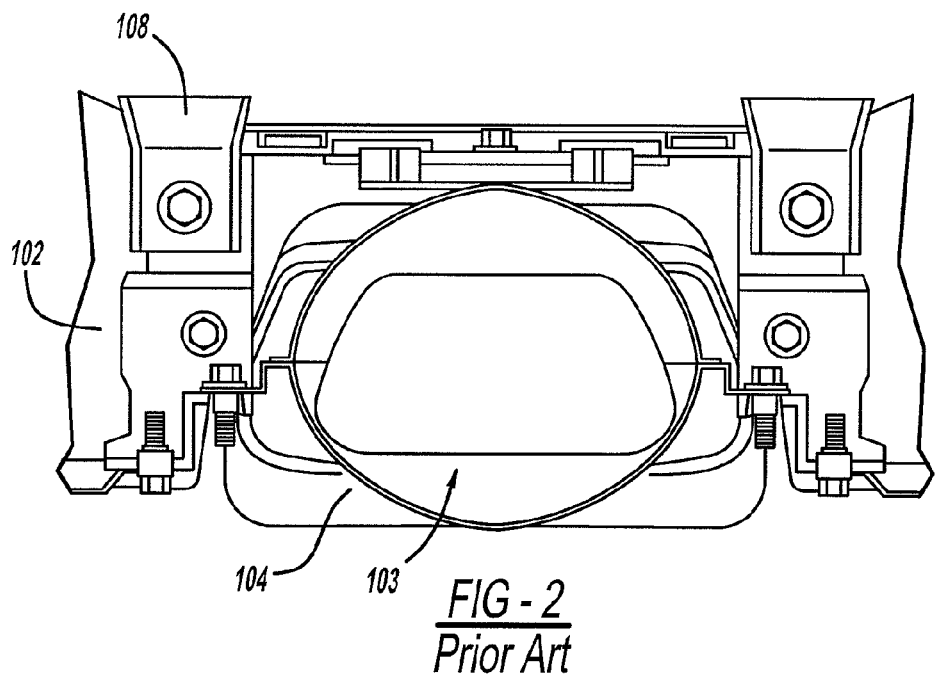
FIG. 2 is a side plan view of a mounted prior art exhaust gas module to a rear fascia of a vehicle.
Figure 2A:
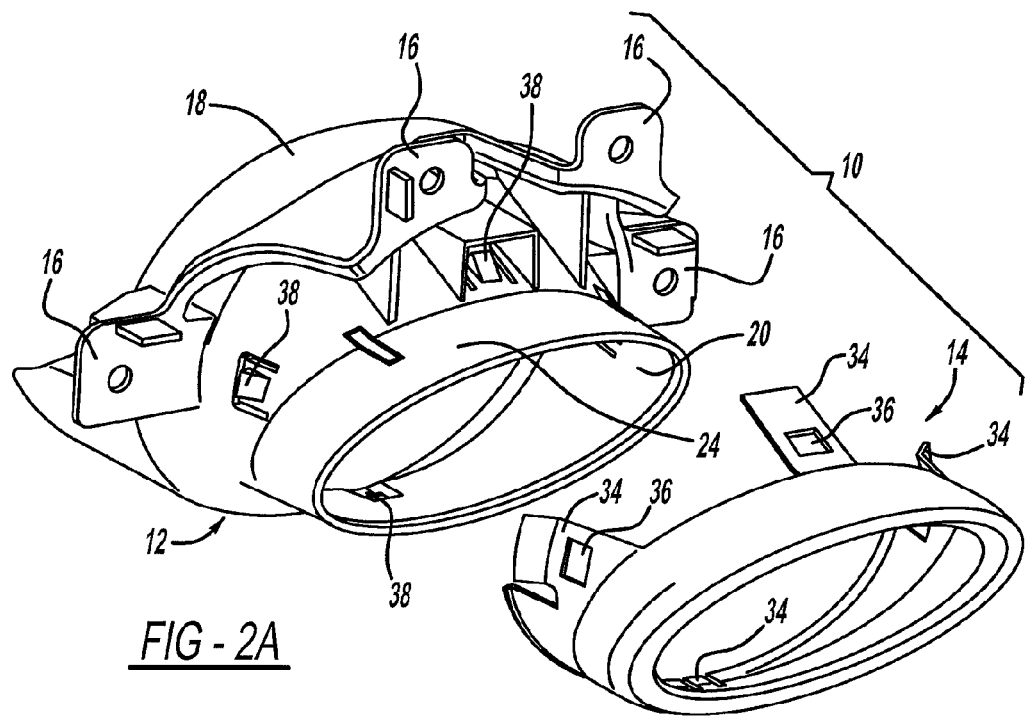
FIG. 2A is an exploded perspective view of an exhaust gas module in accordance with one embodiment of the present invention.
Figure 2B:
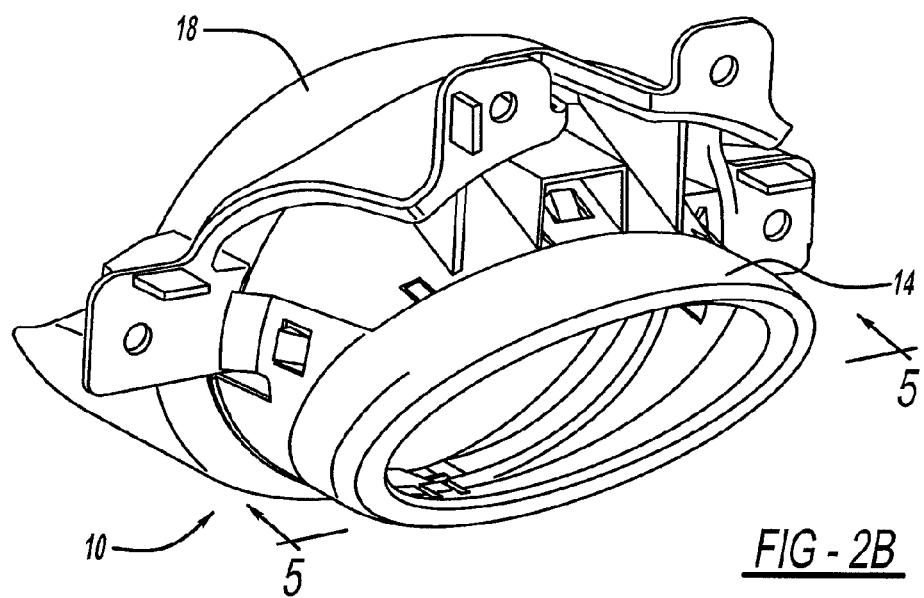
FIG. 2B is a perspective view of an assembled exhaust gas module in accordance with one embodiment of the present invention.
Figure 5:
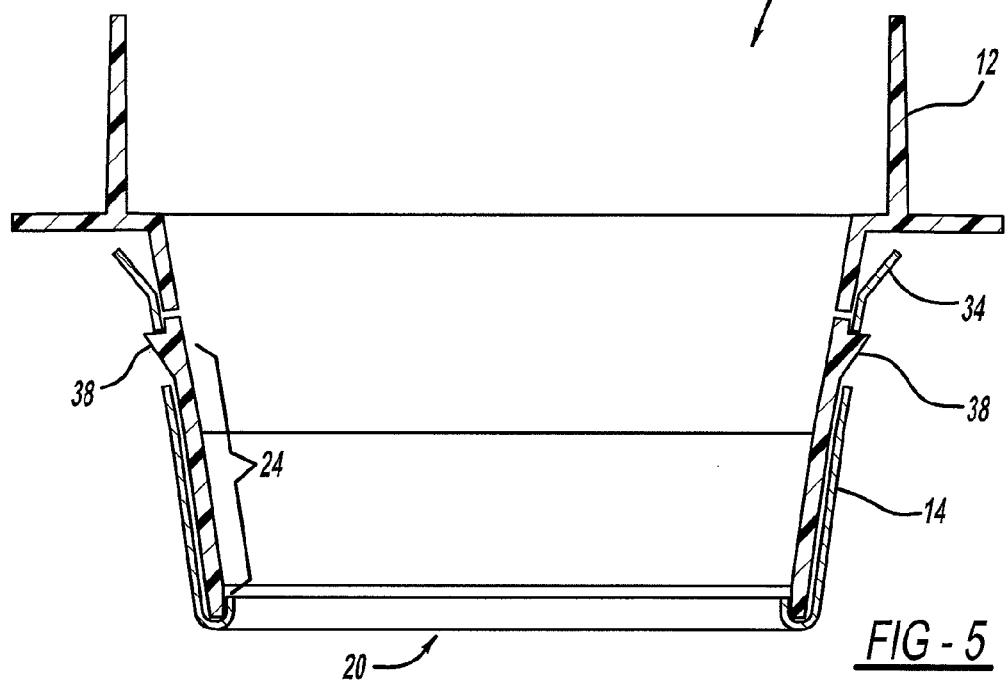
FIG. 5 is a cross-sectional plan view of the exhaust gas module assembled to the bracket taken along section line 5 in FIG. 2B.

The connection between the ring tip 14 and bracket 12 can vary depending on the particular embodiment of the invention. Referring to FIGS. 2A, 2B and 5 the ring tip 14 is connected to the bracket 12 by snap fit tabs. The ring tip 14 has resilient tabs 34 having apertures 36 that connect with protrusions 38 formed on the bracket 12. In another embodiment of the invention shown in FIGS. 4A and 4B the ring tip 14 is slid over the small diameter portion 20 until the mounting features 26 of the small diameter portion 20 becomes interlocked with the mounting features 28 formed integrally with a sleeve 30 of the ring tip 14. In this particular embodiment the mounting features 26, 28 are a "toy tab" or tongue in groove feature. In other embodiments, the ring tip 14 and bracket 12 are connected through other processes, such as adhesion, vibration welding, or the like.

In the embodiments of the invention described herein the bracket 12 has a small diameter portion 20. The small diameter portion 20 is connected to the large diameter portion 18 through a tapered portion or bezel portion 24. The sleeve 30 of the ring tip 14 terminates at a groove 32 portion of the ring tip that receives at least part of the small diameter portion 20 when the module 10 is assembled together. When assembled the bezel portion of the small diameter portion 20 rests against and supports the ring tip 14. This allows the ring tip 14 to be made thinner, which cuts cost and weight. The ring tip 14 in one embodiment is formed of thin gauge stainless steel that is less than fifty thousandths of an inch thick. In another embodiment of the invention the ring tip 14 is formed of thin gauge stainless steel that is between twenty thousandths to forty thousandths of an inch thick. In another embodiment of the invention the ring tip 14 is formed of thin gauge stainless steel that is between twenty thousandths and thirty thousandths of an inch thick. The thickness of the ring tip 14 can vary depending upon the environmental factors, including exhaust gas temperatures exposure for a particular application. It is also possible for the ring tip 14 to be formed of polymeric material and would include a chrome plated plastic that is accomplished using a Polychlorinated Biphenyls PCBs resin or ABS resin with subsequent chrome plating of the resin material.

Figure 7A:
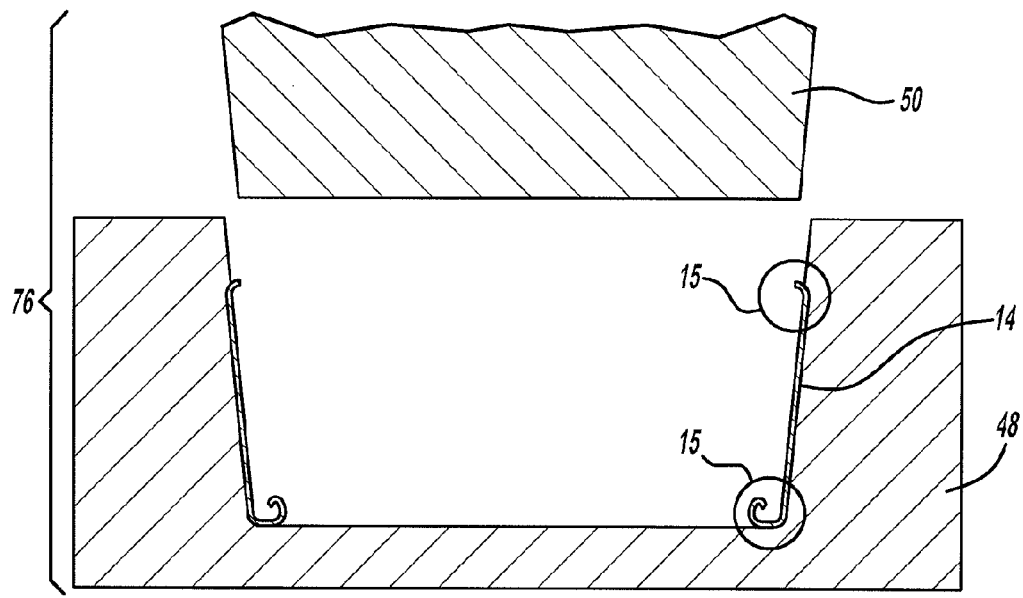
FIG. 7A is a cross-sectional side schematic view of a mold machine for an alternate embodiment of the present invention where the ring tip is insert molded to the bracket.
Figure 7B:
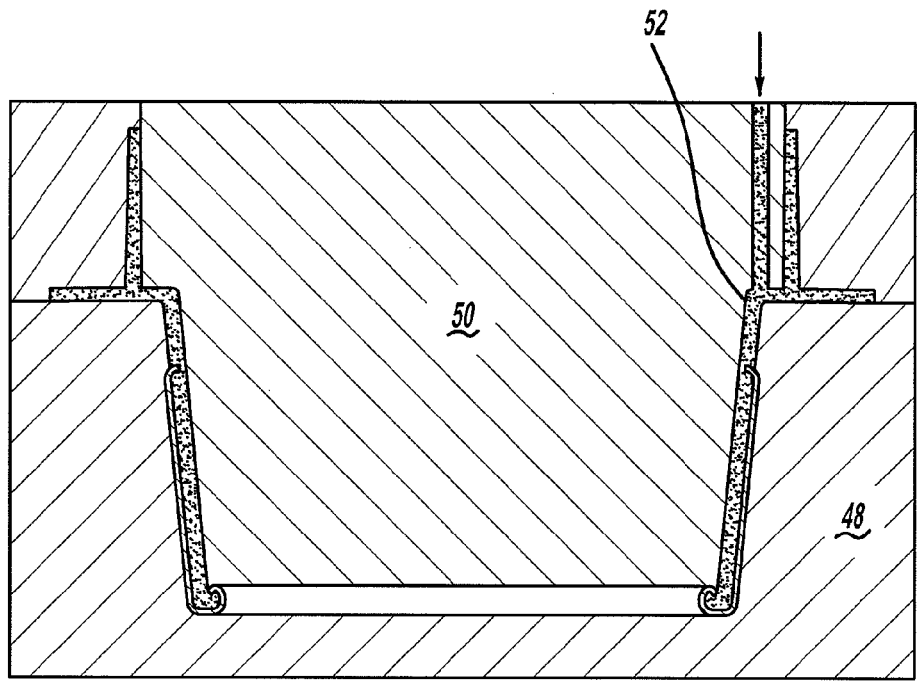
FIG. 7B is a cross-sectional side schematic view of a mold machine for an alternate embodiment of the present invention where the ring tip is insert molded to the bracket.
Figure 7C:
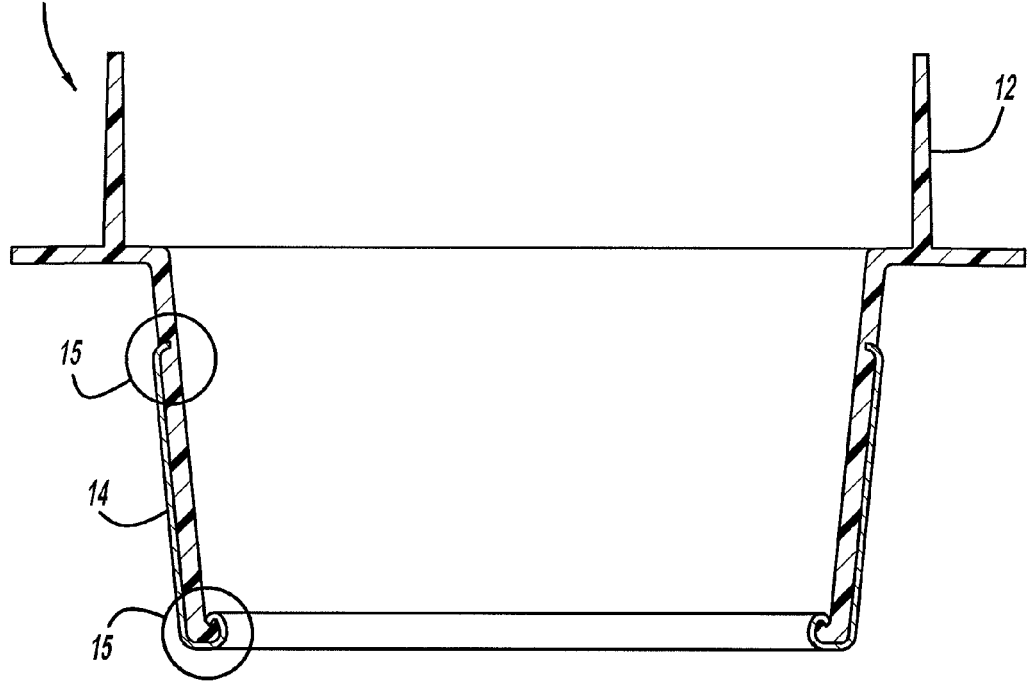
FIG. 7C is a cross-sectional side view of an alternate embodiment of the exhaust module wherein the ring tip has been insert molded onto the bracket.

An alternate method of assembling the ring tip 14 to the bracket 12 is shown in FIGS. 7A-7C wherein insert molding is used to connect the ring tip 14 to the bracket 12. This process involves pre-forming the ring tip 14, which has flow grooves 15 formed at opposite edges of the ring tip 14. The ring tip 14 is placed into a mold cavity of a first platen 48 of a molding machine 46. A second platen 50 is closed on to the first platen 48 and molten polymer 52 is flowed into the molding machine 46 to form the bracket 12. The ring tip 14 becomes connected to the bracket 12 by molten polymer 52 material flowing into the flow grooves 15 of the ring tip 14 prior to solidifying and forming the completed bracket 12.

Once the ring tip 14 is connected to the bracket 12 according to either the snap fit, toy tab, or insert molded methods of assembly described above, the ring tip 14 is brushed and polished to achieve an aesthetically acceptable part. Performing the brush and polish step once assembly is completed allows for the removal of any mold release material that can be present, particularly if the insert molding method of assembly is used. The brush polishing step also removes scratches or flash material that can be present on the ring tip 14.

Figure 6:
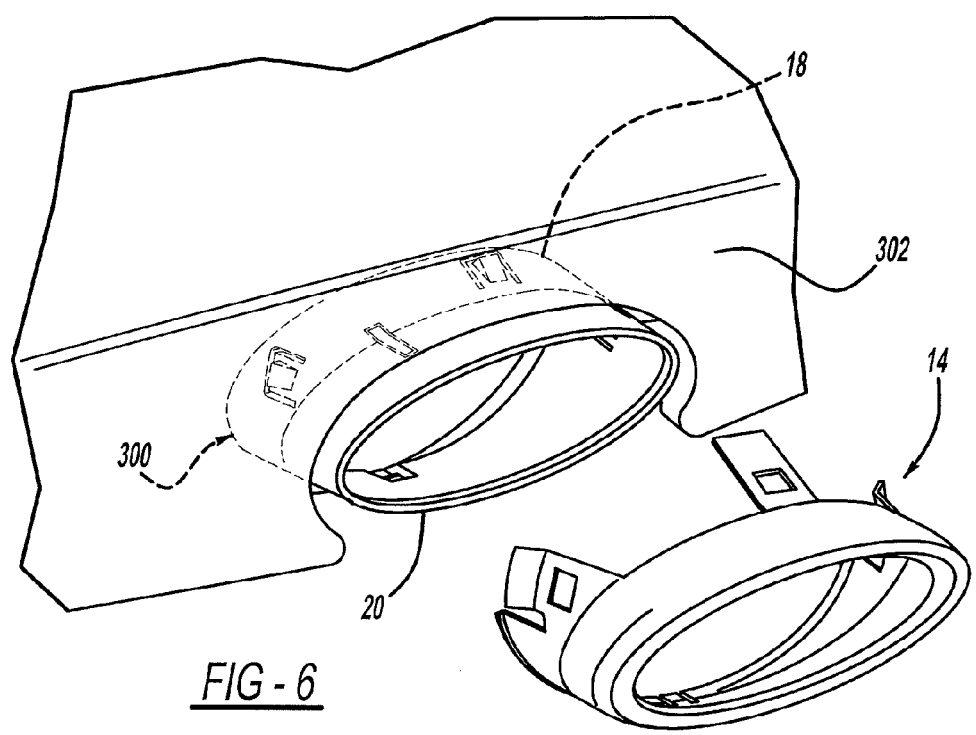
FIG. 6 is an exploded perspective view of an alternate embodiment of the exhaust module assembly wherein the bracket is integrated into the rear fascia.

FIG. 6 shows another alternate embodiment of the invention wherein an exhaust module 300 is integrated into a fascia 302. In this particular embodiment of the invention, the bracket 12 shown in the other embodiments is not present since the exhaust module 300 is molded into the rear fascia during the process of forming the rear fascia. Once the rear fascia 302 is conformed, a large diameter portion 18 and small diameter portion 20 is present and is capable of receiving the ring tip 14. The ring tip 14 can connect to the small diameter portion 20 in the same manner as described in all the embodiments above. This particular embodiment of the invention further eliminates components by no longer requiring a bracket 12 and fasteners for connecting to the rear fascia. Additionally, prior to assembly of the ring tip 14, the fascia 302 can be painted or completed without any special or additional steps since the ring tip 14 will be connected to the small diameter portion 20 in a subsequent step. Therefore, there is no concern about painting or treating the exhaust module 300 during the formation of the fascia 302.

Figure 3A:
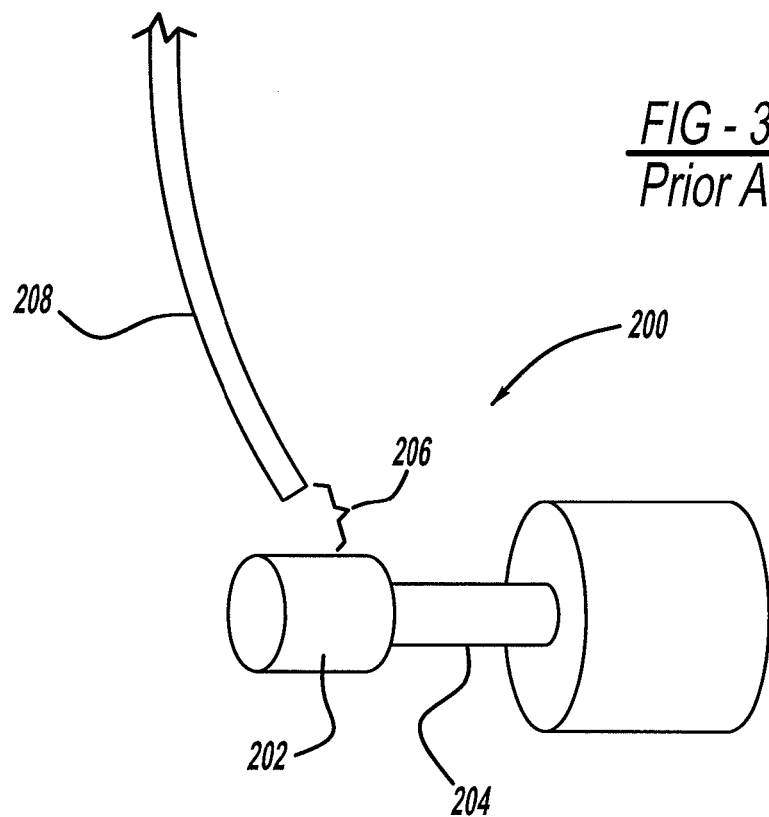
FIG. 3A is a schematic side view diagram of a prior art exhaust tip connected to an exhaust pipe and positioned relative to a portion of a partially broken away portion of the rear fascia.
Figure 3B:
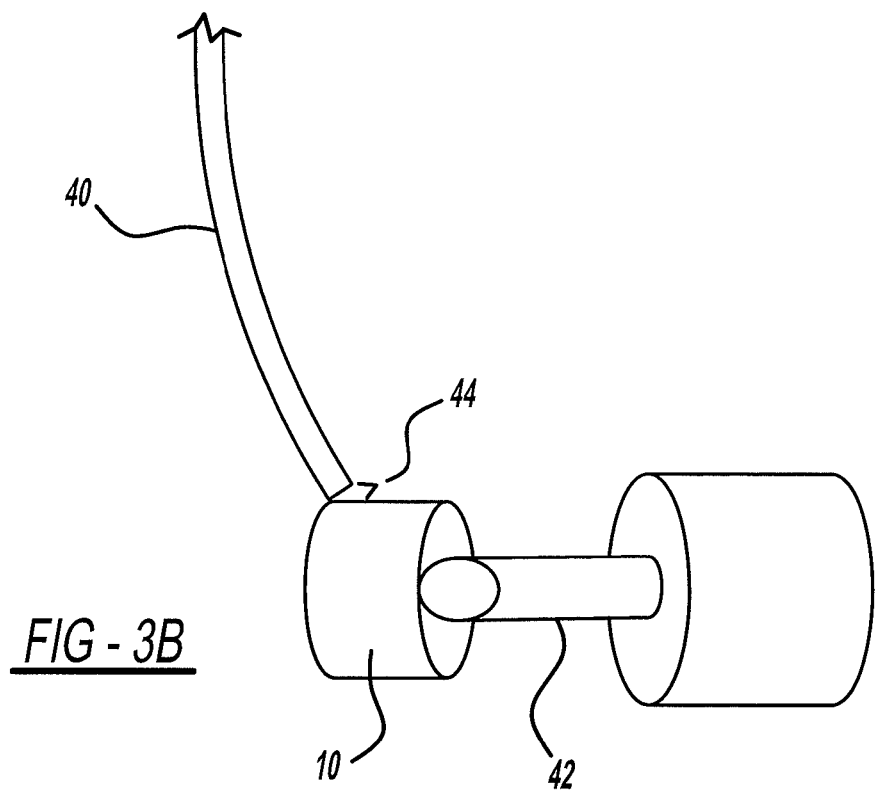
FIG. 3B is a side schematic view of an exhaust module relative to the rear fascia and exhaust pipe in accordance to one embodiment of the present invention.
Figure 4A:
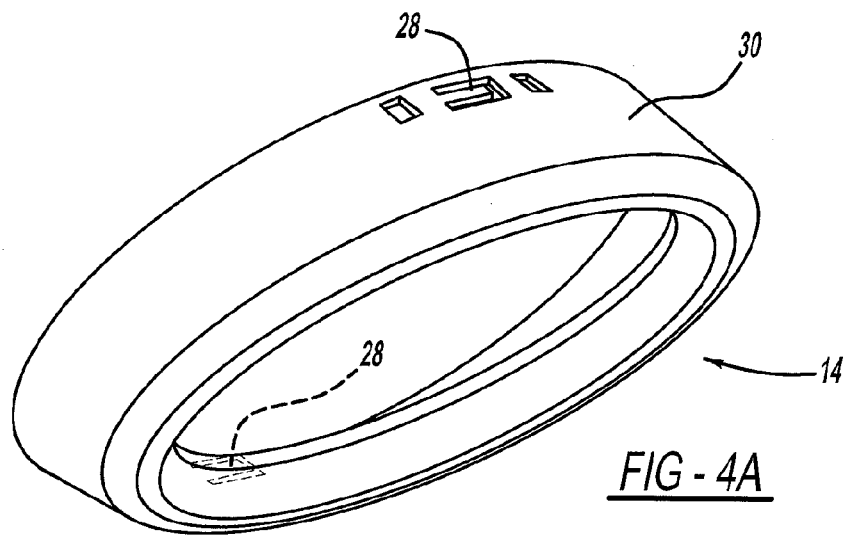
FIG. 4A is a perspective view of an alternate embodiment of a ring tip assembly in accordance with one embodiment of the present invention.
Figure 4B:
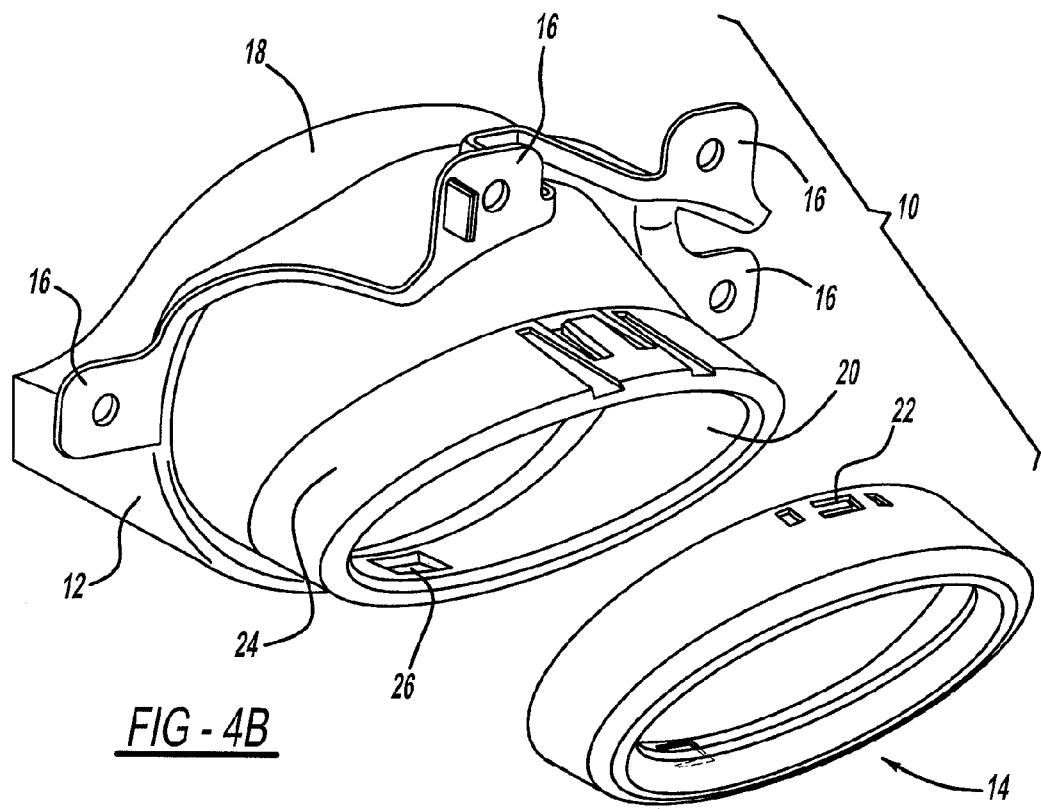
FIG. 4B is an exploded perspective view of an alternate embodiment of the bracket assembly and ring tip assembly of the exhaust gas module in accordance with the present invention.
Figure 4C:
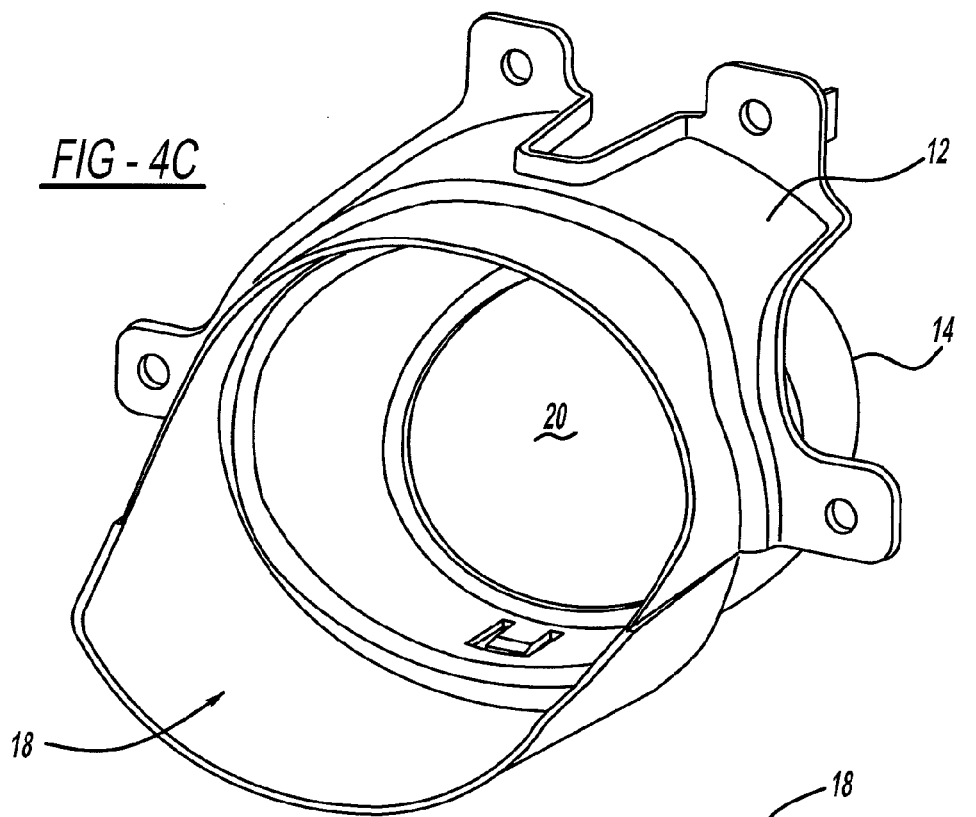
FIG. 4C is a perspective view of the assembled exhaust gas module of FIG. 4B.

Referring now to FIGS. 3A and 3B, the advantages of the present invention are over prior art as shown. FIG. 3A is a schematic side view of a prior art steel exhaust tip assembly 200. A steel exhaust tip 202 is connected to the end of an exhaust tail pipe 204, usually by welding, fasteners or some other attachment mechanism. The steel exhaust tip 202 is positioned below a rear fascia 208 at a distance that provides a suitable gap 206 between the rear fascia 208 and the steel exhaust tip 202. The gap 206 distances can vary but is usually approximately 28 mm or enough distance to account for thermal expansion of the exhaust tip 202 and movement of the assembly 200 as the vehicle moves.

FIG. 3B shows the exhaust module 10 schematically assembled to a rear fascia 40 in accordance with the present invention. A gap 44 is shown between the exhaust module 10 and rear fascia 40. The gap 44 is less than or equal to 5 mm. Thus, the present invention is an improvement over the prior art because a more aesthetically pleasing appearance can be achieved due to the tighter fit and reduced gap 44 between the exhaust module 10 and rear fascia 40.

One reason for the present invention's improvement over prior designs is that the prior designs use a large percentage of metal parts, which requires the designs to account for thermal expansion of the exhaust tip or steel exhaust module. The exhaust module 10 of the present invention is formed entirely of polymer material and in one embodiment implements a thin gauge steel ring tip 14. A smaller gap can be achieved since the polymer material of the exhaust module 10 will not be subject to the same level of thermal expansion that the prior modules are exposed to. Thus, forming the exhaust module 10 of polymer material represents an improvement over existing exhaust modules and exhaust tip designs.

The bracket 12 is a glass-filled, nylon part, or is made from another type of thermoplastic material. The ring tip 14 is made from a polycarbonate (PC), acrylonitrile butadiene styrene (ABS), or other type of thermoplastic material which is injection molded. The ring tip 14 is also chrome plated, to provide an aesthetically pleasing appearance.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An exhaust module assembly for a vehicle comprising;
a bracket formed entirely of polymer;
a large diameter portion of said bracket, said large diameter portion surrounding, but not in contact with an exhaust pipe, thereby creating a clearance between the exhaust pipe and the large diameter portion;
a small diameter portion of said bracket connected to said large diameter portion; and
a ring tip connected to said small diameter portion.

2. The exhaust module of claim 1, further comprising a bezel portion of said small diameter portion wherein a sleeve of said ring tip slides onto said bezel portion and said bezel portion supports said ring tip.

3. The exhaust module of claim 1, wherein said ring tip is made from one selected from the group consisting of polycarbonate (PC), acrylonitrile butadiene styrene (ABS), and combinations thereof and said ring top is chrome plated.

4. The exhaust module of claim 1, wherein said ring tip is made from a thin-gauge bright stainless steel having a thickness less than fifty thousandths of an inch.

5. The exhaust module of claim 1, wherein said bracket is made from a polymer, one selected from the group comprising a glass-filled nylon material, thermoplastic olefin, acrylonitrile butadiene styrene and combinations thereof.

6. The exhaust module of claim 1, wherein said ring tip and said bracket are connected through one process selected from the group consisting of a mechanical connection, adhesion, vibration welding, and combinations thereof.

7. The exhaust module of claim 1 wherein said bracket is not farmed of metal.

8. The exhaust module of claim 1 wherein said ring assembly is not made of metal.

9. The exhaust module of claim 1 further comprising: a rear fascia; one or more mounting flanges formed on said bracket for connecting said bracket to said rear fascia.

10. The exhaust module assembly of claim 1 further comprising: one or more mounting features on said ring tip, and one or more mounting features on said small diameter portion for engaging said one or more mounting features on said ring tip and connecting said ring tip to said small diameter portion of said bracket.

11. The exhaust module assembly of claim 10 wherein said one or more mounting features on said ring tip include a resilient tab with an aperture and said one or more mounting features on said small diameter assembly are protrusions formed on the surface of said small diameter portion for engaging an aperture of said resilient tabs.

12. The exhaust module assembly of claim 11 wherein said one or more mounting features on said ring tip and said one or more mounting features on said small diameter portion are one selected from the group comprising locking tabs, toy-tabs and tongue-in-groove locking mechanisms.

13. The exhaust module assembly of claim 1 wherein said bracket is integrated with a rear fascia and said ring tip is connected to said bracket of said rear fascia after said rear fascia is created.

14. The exhaust module assembly of claim 10 wherein a gap defined by the distance between said ring tip and said rear fascia is less than 5 mm.

15. An exhaust module assembly for a vehicle comprising:
a rear fascia;
a bracket having one or more mounting flanges formed on said bracket for connecting to said rear fascia;
a large diameter portion of said bracket surrounding, but not in contact with an exhaust pipe, thereby creating a clearance between the exhaust pipe and large diameter portion;
a small diameter portion of said bracket connected to said large diameter portion, said small diameter having a bezel portion;
one or more mounting features formed on said small diameter portion;
a ring tip connected to said small diameter portion, wherein said ring tip has a sleeve configured to slide onto and be supported by said bezel portion; and
one or more mounting features on said ring tip for connecting said ring tip to said one or more mounting features of said small diameter portion.

16. The exhaust module of claim 15, wherein said ring tip is made from one selected from the group consisting of polycarbonate (PC), acrylonitrile butadiene styrene (ABS), and combinations thereof and said ring tip is chrome plated.

17. The exhaust module of claim 16, wherein said ring tip is made from a thin-gauge bright stainless steel having a thickness less than fifty thousandths of an inch.

18. The exhaust module of claim 15 wherein said bracket is made from a polymer, one selected from the group comprising a glass-filled nylon material, thermoplastic olefin; acrylonitrile butadiene styrene and combinations thereof.

19. The exhaust module of claim 15 wherein a gap defined by a distance between said ring tip and said rear fascia is less than 5 mm.

20. A method of insert molding an exhaust module assembly for a vehicle comprising the steps of:
- providing a mold machine having a first platen and a second platen for receiving molten polymer;
- providing a ring tip having one or more flow grooves formed on said ring tip;
- placing said ring tip into said first platen of said mold machine;
- moving said second platen into operative engagement with said first platen and flowing molten polymer into said mold machine, wherein said molten polymer flows into said one or more flow grooves of said ring tip;
- forming said molten polymer into a bracket formed entirely of polymer, said bracket including a large diameter portion said bracket for surrounding, but not in contact with an exhaust pipe when said bracket is connected to the vehicle, thereby creating a clearance between the exhaust pipe at the large diameter portion and a small diameter portion of said bracket connected to said large diameter portion ring tip is connected to the small diameter portion when said molten polymer flows into said one or more flow grooves; and
- moving said second platen away from said first platen and removing said bracket and said ring tip which now form said exhaust module assembly.

21. A method of claim 20 further comprising the step of polishing said ring tip.

* * * * *